United States Patent [19]

Hillesland

[11] 4,231,179

[45] Nov. 4, 1980

[54] COMBINATION TAIL-WIGGLING ARTIFICIAL BAIT AND STABILIZER PLUG

[76] Inventor: Gene G. Hillesland, 275 NE. 9th St., Homestead, Fla. 33030

[21] Appl. No.: 63,995

[22] Filed: Aug. 6, 1979

Related U.S. Application Data

[63] Continuation-in-part of Ser. No. 899,715, Apr. 24, 1978, abandoned.

[51] Int. Cl.³ .............................................. A01K 85/00
[52] U.S. Cl. .................................. 43/42.06; 43/42.29; 43/43.13; 43/43.15
[58] Field of Search .................. 43/42.15, 42.24, 42.28, 43/42.29, 42.06, 42.35, 42.36, 43.15, 43.13, 44.8

[56] References Cited

U.S. PATENT DOCUMENTS

| | | | |
|---|---|---|---|
| 2,229,239 | 1/1941 | Davis | 43/42.06 |
| 2,846,805 | 8/1958 | Waitzman | 43/42.06 |
| 3,650,062 | 3/1972 | Troyer | 43/42.06 |
| 3,861,073 | 1/1975 | Thomassin | 43/42.24 |
| 3,964,203 | 6/1976 | Williams | 43/42.06 |
| 4,051,619 | 10/1977 | McClellan | 43/42.24 |
| 4,074,454 | 2/1978 | Cordell | 43/42.29 |

*Primary Examiner*—Nicholas P. Godici
*Attorney, Agent, or Firm*—Erwin M. Barnett

[57] ABSTRACT

A trolling or casting fishing lure combines a tail-wiggling artificial worm with a plug for imparting non-spin and non-surface-skimming stability to the lure. The plug comprises a hollow tubular body formed with a beveled leading end connected at an apex thereof to the fishing line and to a fish hook at a point on the trailing end of the body located in straight line to the apex extending parallel to the longitudinal axis of the body, the fish hook being baited with the artificial worm having a flat crescent-shaped tail to which the wiggling motion is imparted when pulled through the water.

5 Claims, 3 Drawing Figures

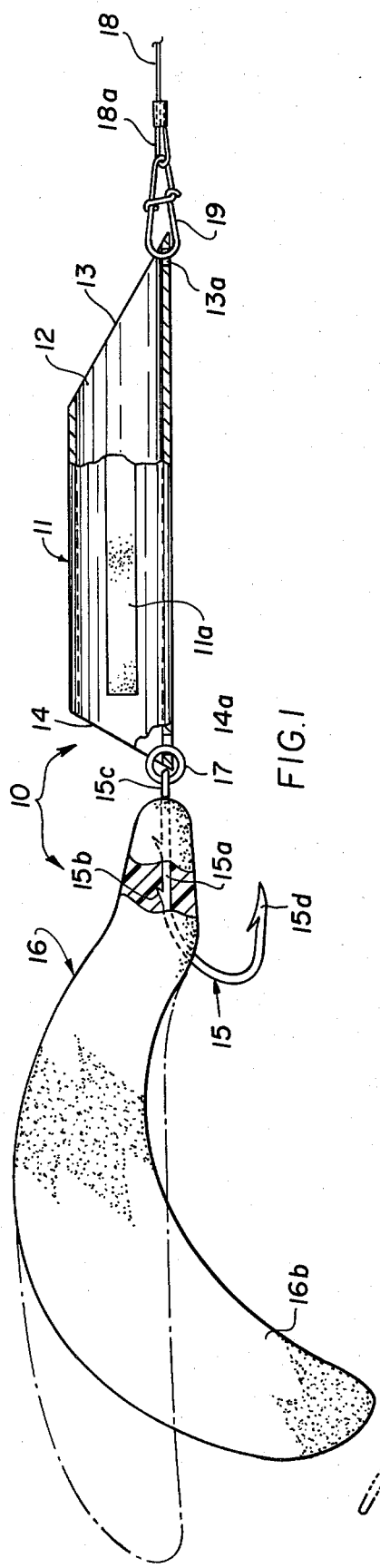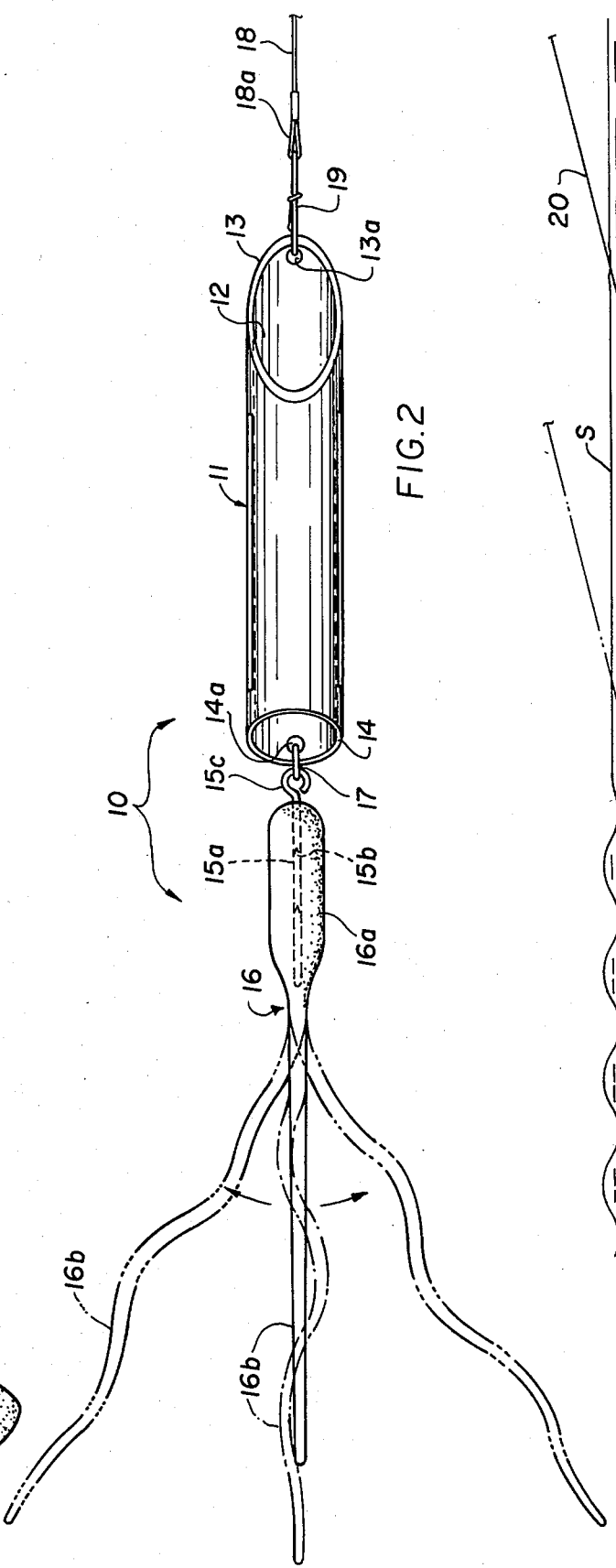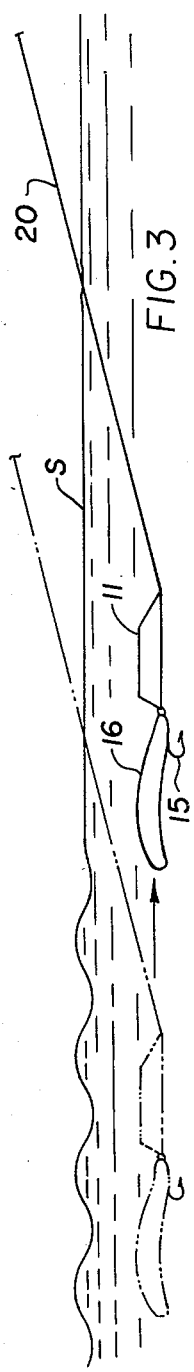

COMBINATION TAIL-WIGGLING ARTIFICIAL BAIT AND STABILIZER PLUG

This is a Continuation-in-Part of my patent application Ser. No. 899,715, filed Apr. 24, 1978 and entitled NON-SPIN FISHING LURE now abandoned.

BACKGROUND OF THE INVENTION

1. Field of the Invention

This invention relates to fishing lures for trolling and casting and particularly is directed to a tail-wiggling artificial worm combined with a stabilizer plug construction for preventing undesirable spinning of the lure and also skimming thereof along the surface of the water at all trolling speeds.

2. Description of the Prior Art

Spinning of the lure when using artificial bait designed for wiggling is an often encountered problem particularly when trolling at relatively high speeds. Also, such artificial bait formed as plastic worms having elongated tails, which depend for their attractiveness to fish on a wiggling movement imparted to the tails when drawn through the water, may come to the surface and lie on their sides when trolling instead of performing as intended. This undesirable spinning of a tail-wiggling worm in addition to reducing the effectiveness of the lure also causes twisting and tangling of the fishing line even when swivel connections are employed. The failure of these swivel connections is one of the drawbacks in using a lure designed specifically for spinning. The twisting weakens the line and increases the likelihood of tangling especially between two parallel lines when trolling therewith from the same boat.

U.S. Pat. No. 3,650,062, granted Mar. 21, 1972 to Troyer suggests the use of a tubular body having an unobstructed bore with the fish hook and line swivel attached at opposite ends of the body. Various structural features are incorporated in the body to create an effective water-reactive surface or end face. The latter reacts with the water as the lure is being pulled therethrough to constantly change the depth and direction of the lure and provide a very lively action in the form of (1) a vertical rocking motion of the lure about a longitudinal axis defined by an imaginary line interconnecting the point of line attachment and the point of hook attachment on the body, (2) a swinging or lateral movement of the rear of the lure relative to the line attachment point, (3) a rotative movement, and (4) infinite combinations of the above actions. One of the tubular body constructions, namely that shown in FIGS. 6 and 7 of the Troyer patent, closely resembles the hereinafter described stabilizer plug. However, when my plug is combined with the tail-wiggling artificial worm in accordance with this invention, it has been found to act as a stabilizing and orientating means for the hook and artificial worm in a manner contrary to that described in the patent and hereinbefore outlined but instead prevents spinning and surface skimming of the lure and enables the worm to provide its desired tail-wiggling action.

SUMMARY OF THE INVENTION

Among the objects of the invention is to provide, in a fishing lure, a plastic worm as artificial bait having an elongated crescent-shaped tail extending behind the hook to which a fish-attracting wiggling movement is imparted when drawn through the water and which is stabilized against spinning and surface-skimming by a plug to which the fish hook baited with the artificial worm is attached. The plug shall be inexpensive to manufacture of aluminum or plastic tubular stock, shall be easy to use, dependable in operation and versatile under a broad range of conditions.

The invention features a stabilizer plug to which the hook baited with a tail-wiggling plastic worm is attached to comprise a fishing lure designed for tail-wiggling in a horizontal plane in a swimming motion when pulled through the water. The plug is a tubular body having a relatively large axial bore extending between opposite leading and trailing ends. The leading end of the tubular plug is beveled, that is, asymmetrically tapered or rearwardly inclined from an apex to which the fishing line is attached. The hook is attached to the trailing end of the plug at a point opposite the apex, that is, a point located on a straight line of attachment which extends along the tubular wall of the plug parallel to the longitudinal axis of the bore and passing through both points of attachment. The hook is mounted to curve away from the plug, that is, downwardly in a vertical plane with respect to the orientation to be assumed by the plug. The plastic worm has a bulbous head for threading onto the shank of the hook and a flat crescent-shaped tail which trails behind the hook, the flat plane thereof being co-planar with the hook. As the lure is pulled through the water, the shank of the hook will align itself with the straight line of attachment and with the fishing line, the crescent-shaped tail will tend to straighten causing undulations therein which activate the wiggling motion, while the stabilizer plug will orientate itself beneath the surface of the water with the axial bore located above the straight line of attachment and will resist spinning as well as lateral motion.

BRIEF DESCRIPTION OF THE DRAWING

FIG. 1 is a side elevational view of a fishing lure embodying the invention showing the stabilizer plug to which a hook baited with the plastic worm is attached, the flat tail of the worm being shown in broken lines in an extended functioning position and the stabilizer plug shown in the upright position assumed by the lure when being pulled through the water toward the right.

FIG. 2 is a top plan view of the fishing lure shown in FIG. 1, the undulations and lateral swings of the tail with respect to the bulbous head of the worm illustrating the movement thereof being shown in broken lines, and FIG. 3 is a side elevational diagramatic view illustrating the orientation of the lure shown in FIG. 1 with respect to the surface of the water during trolling.

DESCRIPTION OF THE PREFERRED EMBODIMENT

Referring in detail to the drawing, 10 generally denotes a fishing lure comprising a stabilizer plug 11 interposed between the conventional leader 18, which attaches at a leading end thereof to a fishing line 20, indicated in FIG. 3, and a fish hook 15 baited with plastic worm 16.

Stabilizer plug 11 of fishing lure 10 may be formed from rigid tubular metal or plastic stock which may be circular in cross-section, as herein shown, or of elliptical or polygonal shape, and have a relatively large axial bore 12 extending between leading and trailing ends 13 and 14, respectively. Leading end 13 is beveled, that is, tapers on a rearward incline from a single apex which is formed with a centered opening 13a for attachment to leader 18 or directly to the fishing line 20. Likewise, the trailing end 14 is formed with a corresponding opening 14a for attachment to hook 15. As shown in FIG. 2, trailing end opening 14a is located on a straight line of attachment passing through apex opening 13a and extending parallel to the longitudinal axis of plug 11 which is coextensive with the axis of bore 12.

Fish hook 15 of lure 10 may be of any conventional construction herein shown as having a shank 15a terminating at the attachment end thereof by loop 15c and at the hooked end by barbed point 15d. A pair of spaced barbs 15b pointed toward loop 15c may be formed along shank 15a for retaining the bait threaded thereon in the well understood manner and in desired orientation as hereinafter described.

Plastic worm 16 is made of a soft, pliable, latex-like material, such as a plasticized polyvinyl chloride, which is particularly suitable for molding as artificial bait in a form to provide the herein featured tail-wiggling characteristics for lure 10 when stabilized against spinning and surfacing by plug 11. Worm 16 is formed with a bulbous head 16a for threading onto shank 15a of hook 15 and a flat crescent-shaped tail 16b sized and shaped to trail behind hook 15 and, when pulled through the water, the crescent tends to straight and in doing so assumes the configuration shown in broken lines in FIG. 1 and creates the undulations indicated in broken lines in FIG. 2 which impart the wiggling motion to the tail.

Hook 15 is connected to stabilizer plug 11 as shown in FIGS. 1 and 2, that is, with the plane of hook 15 in coplanar relation with the diametric plane of plug 11 passing through the straight line of attachment of openings 13a and 14a with hook 15 being orientated so that point 15d curves downwardly away from plug 11. Similarly, plastic worm 16 is mounted on shank 15a and retained in position by barbs 15b so that the height, that is, the flat plane of tail 16b extends co-planar with said diametric plane and the plane of the hook for providing the lateral undulations with respect thereto.

Any suitable linkage engaging opening 14a may be employed for connecting hook 15 to plug 11 in proper alignment as shown and hereinbefore described. Where loop 15c lies in a plane perpendicular to that of hook 15, as shown in FIGS. 1 and 2, a connecting ring 17 provides a link therebetween. Ring 17 may be of a solid, welded type for maximum strength But permanently linking loop 15c to opening 14a, or in the well known manner, connecting ring 17 may be of a split-ring construction providing an easy removal and replacement capability between hook 15 and stabilizer plug 11. Where loop 15c is formed co-planar with hook 15, the former may directly engage opening 14a.

Any conventional leader may be used to connect lure 10 to the fishing line 20, such as, leader 18, herein shown as having a terminal loop 18a secured to a snap-on connector 19 for removably engaging opening 13a at the apex of beveled leading end 13 of plug 11.

The overall exterior surface of plug 11 may be suitably colored, as by anodizing when plug 11 is aluminum, or by coloring the plastic mix when plug 11 is an extruded plastic material, or in either case by painting or covering plug 11 with a colored adhesively secured waterproof thin plastic sheet. Complementing the overall color, additional decorative stripes and/or dots 11a of contrasting color and distinctive light reflective characteristics may be adhesively attached to enhance the attractiveness of lure 10 to fish.

The practical utility and operation of fishing lure 10, constructed and assembled to embody the invention as hereinbefore described, will now be apparent. While being pulled through the water at any desirable trolling speeds or while being reeled in when casting, the action of plug 11 causes lure 10 to orientate itself beneath the surface S of the water in the upright position shown in FIG. 3 and to resist both lateral movement from the path along which it is being pulled and axial rotation or spinning thereby insuring the intended tail-wiggling of worm 16 and avoiding the problems and disadvantages thereinbefore mentioned.

As illustrated by the arrows and the lateral broken line positions in FIG. 2, tail 16b pivots, that is swings, laterally in a horizontal plane with respect to a vertical axis located just behind bulbous head 16a and hook 15. This swinging motion extends through an arc of 20° to 30° on each side of the forward path of movement of lure 10, as indicated by the arrows while tail 16b simultaneously undulates along the length thereof, also as indicated in broken lines. Both these movements contribute to lure 10 resembling a swimming fish.

Lure 10 is equally suitable for fresh water and salt water fishing and for use with either light or heavy weight tackle. The relatively light weight and low drag characteristics provided plug 11 by the structure thereof contribute to the versatility of lure 10 and its particular suitability to light weight tackle. Plug 11 may be made of tubular stock having ODs from ½ to 2 inches with wall thichnesses of less than 1/16th of an inch for the small diameter tubular stock to about 3/16th of an inch for large diameters, thereby providing axial bores of maximum diameters and overall minimum weights. Likewise, the ratio of overall length of plug 11 to diameter may vary from approximately 3-1 to 5-1.

While for proper operation, trailing end 14 of plug 11 may slope in any direction or at any angle, for example, forwardly at slightly less than 90° with respect to the straight line of attachment between openings 13a and 14a as illustrated in FIG. 1 to facilitate attachment of hook 15, or end 14 may extend at right angles, or at more than 90° to the line of attachment, leading end 13 is required to be inclined rearwardly, that is, at less than 90° with respect to the straight line of attachment. However, the approximate 30° incline of leading end 13 shown in FIG. 1 may be considered optimum rather than limiting.

To achieve the desired tail-wiggling action, tail 16b should be thin and broad as illustrated. For example, lure 10 made in a mid-range size suitable for catching fish ranging from 1 to 100 lbs may comprise a plug 11 having ¾ inch OD and overall length of 3½ to 4 inches in combination with a worm 16 having a tail 16b approximating 4 inches in length when in a straightened condition, 1/16th of an inch in thickness and a breadth, that is a height, of approximately 1 inch measured through a mid-section thereof.

The artificial tail-wiggling worm lure with its stabilizer plug is seen to achieve the several objects of the invention and to be well adapted to meet conditions of use as a practical alternative to lures which depend for their attractiveness on spinning and darting motions. As various possible embodiments might be made of this invention, and as various changes might be made in the disclosed construction, it is to be understood that all matter and dimensions herein set forth or shown in the accompanying drawing are to be interpreted as illustrative and not in a limiting sense.

What is claimed is:

1. A fishing lure comprising a hook having a shank, an artificial tail-wiggling worm formed of soft, pliable plastic having a bulbous head threaded onto the shank of said hook and a flat, thin crescent-shaped tail sized to extend behind the hook, and a stabilizer plug providing non-spinning and non-surface-skimming capability to the lure, said plug having a tubular wall and a large axial bore extending therethrough between opposite leading and trailing ends, the leading end of the tubular wall being inclined rearwardly from an apex, means connecting said apex to a fishing line, said fish hook shank being connected to the trailing end of said tubular wall at a point on a straight line of attachment extending along said tubular wall parallel to the longitudinal axis of said bore and passing through said apex, said hook and tail being orientated to extend in co-planar relation with the diametric plane of said straight line of attachment of said plug, the hook curving away from the plug and the tail being co-planar with the hook, said plug being self-orientating below the surface of the water with the straight line of attachment located on the underside of the plug and disposing said planes vertically when the lure is pulled through the water enabling the crescent shape of said tail to straighten causing undulation and lateral swinging of the tail as fish attracting motion.

2. The fishing lure defined in claim 1 in which said apex connecting means to the fishing line includes a first opening in the tubular wall centered with respect to said apex, and the fish hook connection includes a second opening in the tubular wall adjacent said trailing end, said first and second openings being located along said straight line of attachment.

3. The fishing lure defined in claim 1 in which the shank of said hook is formed with barbs engaging said bulbous head for retaining the worm on the shank with the tail and hook in said co-planar relation.

4. The fishing lure defined in claim 1 in which said rearward incline of the leading end of the plug is at an optimum angle of 30° with respect to said straight line of attachment.

5. The fishing lure defined in claim 1 in which said lure is of a size for catching fish ranging from 1 to 100 lbs., said plug having an OD of ¾th inch and overall length of between 3½ and 4 inches, said tail of the worm approximating 4 inches in length in said straightened condition, 1/16th of an inch in thickness and a vertical height of approximately 1 inch measured through a mid-section.

* * * * *